United States Patent Office 3,014,947
Patented Dec. 26, 1961

3,014,947
PHOSPHINYL DIESTERS OF PHOSPHONITES
Gail H. Birum, Dayton, Ohio, assignor to Monsanto Chemical Company, St. Louis, Mo., a corporation of Delaware
No Drawing. Filed July 5, 1960, Ser. No. 40,551
12 Claims. (Cl. 260—461)

The present invention relates to organic phosphorus compounds and more particularly provides new and valuable phosphinyl diesters of hydrocarbylphosphonous acids and the method of preparing the same.

According to the invention, new diphosphinyl phosphonites are provided by the reaction of a hydrocarbylphosphonous dichloride with an aldehyde and a triorgano phosphorus ester substantially according to the scheme

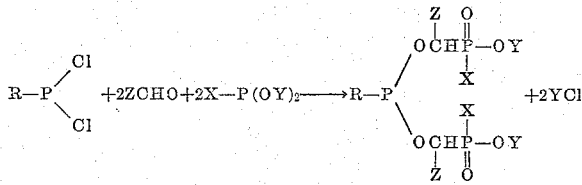

in which R is a hydrocarbyl radical free of aliphatic unsaturation and contains from 1 to 12 carbon atoms, Z is selected from the class consisting of hydrogen and hydrocarbyl radicals which are free of aliphatic unsaturation and which contain from 1 to 11 carbon atoms, Y is selected from the class consisting of alkyl and haloalkyl radicals of from 1 to 12 carbon atoms, and X is selected from the class consisting of —OY and R.

Examples of the presently useful hydrocarbylphosphonous dichlorides are the arylphosphonous dichlorides such as phenylphosphonous dichloride, α- or β-naphthylphosphonous dichloride, and 2-, 3- or 4-biphenylylphosphonous dichloride; the alkylphosphonous dichlorides such as methyl-, ethyl-, isopropyl-, n-butyl, tert-butyl-, n-pentyl-, n-hexyl-, 2-ethylhexyl-, n-octyl-, branched-chain nonyl-, isodecyl-, n-dodecyl-, and tert-dodecylphosphonous dichloride; the aliphatic-aromatic phosphonous dichlorides such as o-, m- or p-tolylphosphonous dichloride; diisopropylphenylphosphonous dichloride, mesitylphosphonous dichloride, n-hexylphenylphosphonous dichloride, β-methyl-α-naphthylphosphonous dichloride, benzylphosphonous dichloride, o-, m- or p-n-butylbenzylphosphonous dichloride, 2-phenylethylphosphonous dichloride and β-naphthylmethylphosphonous dichloride; the cycloalkylphosphonous dichlorides such as cyclohexylphosphonous dichloride and 4-methylcyclopentylphosphonous dichloride; etc.

The presently useful aldehydes are formaldehyde and the hydrocarbon aldehydes which are free of olefinic and acetylenic unsaturation. They include, in addition to formaldehyde, the alkanecarboxaldehydes such as acetaldehyde, propionaldehyde, n-butyraldehyde, isobutyraldehyde, valeraldehyde, isovaleraldehyde, n-hexaldehyde, n-heptaldehyde, 2-ethyl-hexaldehyde, n-octaldehyde, branched-chain nonanal derived by the "Oxo" process, either n-decanal or branched-chain decanal derived by the "Oxo" process, n-undecanal, and lauraldehyde; the benzenoid aldehydes such as benzaldehyde, o-, m- or p-tolualdehyde, phenylacetaldehyde, 2-phenylpropionaldehyde, 4-ethylphenylacetaldehyde, n-hexylbenzaldehyde, biphenylcarboxaldehyde, and α- or β-naphthaldehyde; and the cycloparaffinic aldehydes, such as cyclohexanecarboxaldehyde or 2-methylcyclopentanecarboxaldehyde, etc.

Triorgano phosphorus esters useful for the present purpose are either phosphites or phosphonites; e.g., the simple trialkyl phosphites, such as trimethyl, triethyl, triisopropyl, tri-n-butyl, triamyl, tri-n-hexyl, tri-(2-ethylhexyl), tridecyl, or tridodecyl phosphites; the mixed trialkyl phosphites such as dimethyl ethyl, diamyl propyl, ethyl methyl propyl, or dodecyl dimethyl phosphites; the simple haloalkyl phosphites, such as tris(2-chloroethyl), tris(2-chloropropyl), tris(3-bromopropyl), tris(dichlorooctyl) and tris(2-bromo-3-chloropropyl) phosphites; the mixed haloalkyl phosphites, such as 2-chloroethyl bis(3-bromopropyl) phosphite or 2-chloroethyl 4-bromobutyl 2-chloropropyl phosphite; and mixed phosphites of both paraffinic and haloparaffinic alcohols such as bis(2-chloroethyl) methyl phosphite or 2-chloropropyl diethyl phosphite. Examples of the presently useful phosphonites are the dialkyl or bis(haloalkyl) hydrocarbylphosphonites such as dimethyl, diethyl, diisopropyl, bis(2-ethylhexyl), or didodecyl butylphosphonite or p-tolylphosphonite or cyclohexylphosphonite; bis(2-chloroethyl), bis(2,3-dibromopropyl), or bis(trifluorobutyl) phenylphosphonite or cyclopentyl phosphonite; 2-iodoethyl octyl benzylphosphonite, dimethyl α-naphthylphosphonite; bis(2-fluorethyl) 4-biphenylylphosphonite; dibutyl or dipropyl methylphosphonite; dipentyl or dihexyl 4-hexylphenylphosphonite, etc.

Reaction of the hydrocarbylphosphonous dichloride with formaldehyde and a trialkyl phosphite or a tris(haloalkyl) phosphite yields bis[(dialkoxyphosphinyl)methyl] hydrocarbylphosphonites when a trialkyl phosphite is used or bis{[bis(haloalkoxy)phosphinyl]methyl} hydrocarbylphosphonites when a tris(haloalkyl) phosphite is used, i.e., compounds of the formula

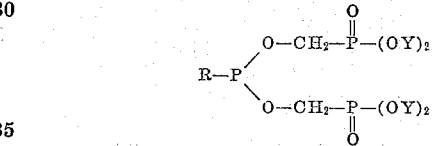

wherein R is a hydrocarbyl radical which is free of olefinic and acetylenic unsaturation and which contains from 1 to 12 carbon atoms and Y is selected from the class consisting of alkyl and halogen-substituted alkyl radicals of from 1 to 12 carbon atoms. Thus, from ethylphosphonous dichloride, and substantially 2 moles each of formaldehyde and of trimethyl phosphite there is obtained bis[(dimethoxyphosphinyl)methyl] ethylphosphonite, i.e., a compound of the formula in which R is ethyl and Y is methyl. Similarly, from phenylphosphonous dichloride, formaldehyde and tris(2-chloroethyl) phosphite there is obtained bis{[bis(2-chloroethoxy)phosphinyl]methyl} phenylphosphonite; and from cyclohexylphosphonous dichloride, formaldehyde and tridodecyl phosphite there is obtained bis[(didodecyloxyphosphinyl)methyl] cyclohexylphosphonite.

The reaction of a hydrocarbylphosphonous dichloride, an alkanecarboxaldehyde and a trialkyl or tris(haloalkyl) phosphite gives either bis[1-(dialkoxyphosphinyl)alkyl] hydrocarbylphosphonites or bis{1-[bis(haloalkoxy)phosphinyl]alkyl} hydrocarbylphosphonites, depending upon whether a trialkyl phosphite or a tris(haloalkyl) phosphite is used, i.e., the products thus obtained have the formula

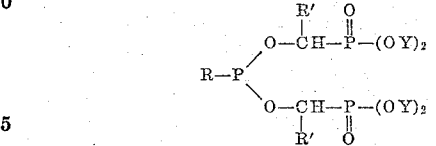

where R and Y are as defined above and R' is an alkyl radical of from 1 to 11 carbon atoms. Thus, the reaction product of pentylphosphonous dichloride, acetaldehyde and tri-n-propyl phosphite gives a compound in which R of the above formula is phentyl, R' is methyl and Y is propyl, i.e., bis[1-(dipropoxyphosphinyl)ethyl]

pentylphosphonite. Other compounds provided by the invention from a hydrocarbylphosphonous dichloride, an alkanecarboxaldehyde and a trialkyl or tris(haloalkyl) phosphite are as follows:

bis[1-(dimethoxyphosphinyl)propyl] phenylphosphonite
bis[1-(diethoxyphosphinyl)ethyl] α-naphthylphosphonite
bis[1-(diethoxyphosphinyl)-2-ethylhexyl] ethylphosphonite
bis[1 - (didodecyloxyphosphinyl)ethyl] biphenylylphosphonite
bis{1-[bis(2-bromoethoxy)phosphinyl] dodecyl} p-tolylphosphonite
bis{1 - [bis(2 - chloropropoxy)phosphinyl]butyl} benzylphosphonite
bis{1 - [bis(2 - ethylhexyloxy)phosphinyl]propyl} ethylphosphonite
bis{1-[bis(2 - iodoethoxy)phosphinyl]ethyl} phenylphosphonite
bis[1-(diethoxyphosphinyl)ethyl] cyclohexylphosphonite
bis{1-[bis(2-chloropropoxy)phosphinyl]-2-methylpropyl} n-butylphosphonite
bis{1-[bis(2-chloroethoxy)phosphinyl]butyl} butylphosphonite.

Employing a benzenoid carboxaldehyde with the hydrocarbylphosphonous dichloride and a trialkyl phosphite yields the bis[α-(dialkoxyphosphinyl)aralkyl] hydrocarbylphosphonites, i.e., compounds of the formula

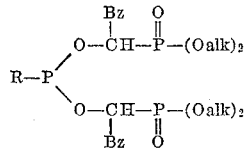

in which R is a hydrocarbyl radical which is free of olefinic and acetylenic unsaturation and which contains from 1 to 12 carbon atoms, Bz denotes a benzenoid radical of from 6 to 11 carbon atoms, and alk denotes an alkyl radical of from 1 to 12 carbon atoms. Thus, phenylphosphonous dichloride, benzaldehyde and trimethyl phosphite give bis[α-(dimethoxyphosphinyl)benzyl] phenylphosphonite; n-propylphosphonous dichloride, p-tolualdehyde and tris(2-chloroethyl) phosphite gives bis{α-[bis-(2-chloroethoxy)phosphinyl]-p-methylbenzyl} n-propylphosphonite; cyclohexanephosphonous dichloride, phenylacetaldehyde and triethyl phosphite give bis[1-(diethoxyphosphinyl) - 2 - phenylethyl] cyclohexylphosphonite; β-naphthylphosphonous dichloride, p-isopropylbenzaldehyde, and tri-n-butyl phosphite give bis[α-(di-n-butoxyphosphinyl)-p-isopropylbenzyl] β - naphthylphosphonite; 4-biphenylylphosphonous dichloride, benzaldehyde and tetrachlorododecyl phosphite give bis{α-[bis(tetrachlorododecyloxy)phosphinyl]benzyl} 4-biphenylylphosphonite; benzylphosphonous dichloride, β-naphthaldehyde, and triethyl phosphite give bis[(diethoxyphosphinyl) (α-naphthyl)methyl] benzylphosphonite; 4 - pentylphenylphosphonous dichloride, benzaldehyde and tris(2-bromoethyl) phosphite give bis{α-[bis(2 - bromoethoxy)phosphinyl]-benzyl} 4-pentylphenylphosphonite; phenylphosphonous dichloride, o-tolualdehyde, and tris(2-fluoroethyl) phosphite give bis{α-[bis(2-fluoroethoxy)phosphinyl]-o-methylbenzyl} phenylphosphonite, etc.

Cycloalkanecarboxaldehydes react as do the alkanecarboxaldehydes or the benzenoid carboxaldehydes with the hydrocarbylphosphonous dichlorides and the triorgano phosphites. Thus, cyclohexanecarboxaldehyde, phenylphosphonous dichloride and trimethyl phosphite yield bis[(dimethoxyphosphinyl)(cyclohexyl)methyl] phenylphosphonite; and n-butylphosphonous dichloride, cyclohexanecarboxaldehyde and tris(2-chloroethyl) phosphite yield bis{[(2-chloroethoxy)phosphinyl)cyclohexyl)methyl} n-butylphosphonite.

Phosphonites react as do the phosphites in the reaction with the carboxaldehyde and the hydrocarbylphosphonous dichloride. There are thus obtained bis[(alkoxyhydrocarbylphosphinyl)hydrocarbyl] hydrocarbylphosphonites when a dialkyl hydrocarbylphosphonite is employed with a hydrocarbon carboxaldehyde and a hydrocarbylphosphonous dichloride, i.e., compounds of the formula

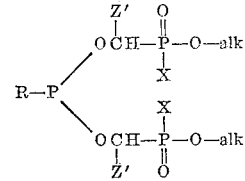

where R and X are hydrocarbyl radicals free of aliphatic unsaturation and contain from 1 to 12 carbon atoms, Z' is a hydrocarbyl radical free of aliphatic unsaturation and containing from 1 to 11 carbon atoms, and alk denotes an alkyl radical of from 1 to 12 carbon atoms. In the above formula R is the hydrocarbyl radical which is derived from the hydrocarbylphosphonous dichloride, Z' is the hydrocarbyl radical which is derived from the carboxaldehyde, X is the hydrocarbyl portion of the dialkyl hydrocarbylphosphonite, and alk denotes one of the two alkyl radicals. Thus, reaction of phenylphosphonous dichloride, acetaldehyde and dimethyl butylphosphonite gives bis[1 - (methoxybutylphosphinyl)propyl] phenylphosphonite; the reaction of ethylphosphonous dichloride, benzaldehyde and diisopropyl α-naphthylphosphonite gives bis[α - (isopropoxy-α-naphthylphosphinyl)benzyl] ethylphosphonite; the reaction of cyclopentylphosphonous dichloride, dodecanal and didodecyl benzylphosphonite gives bis[1-(dodecyloxybenzylphosphinyl)dodecyl] cyclopentylphosphonite; and the reaction of 4-biphenylphosphonous dichloride, cyclohexanecarboxaldehyde, and diethyl decylphosphonite gives bis[1-(ethoxydecylphosphinyl)cyclohexylmethyl]-1-biphenylylphosphonite. Using a haloalkyl ester of the hydrocarbylphosphonic acid as the triorgano phosphorus ester component, instead of the alkyl ester, the reaction with the aldehyde and phosphonous dichloride yields the bis{[(haloalkoxy)hydrocarbylphosphinyl]hydrocarbyl} hydrocarbylphosphonite, e.g., cyclohexanephosphonous dichloride, butyraldehyde and bis(2-chloroethyl) methylphosphonite give bis{1-[(chloroethoxy)methylphosphinylbutyl} cyclohexanephosphonite. Other compounds provided by the invention by the reaction of a hydrocarbylphosphonous dichloride, an aldehyde and a dialkyl or bis(haloalkyl) hydrocarbylphosphonite are shown below:

bis[1 - (ethoxyphenylphosphinyl)methyl]4 - butylphenylphosphonite
bis[α - (hexyloxybutylphosphinyl)benzyl]cyclohexylphosphonite
bis[1 - (butoxycyclohexylphosphinyl)methyl] 4 - propylphosphonite
bis{α - [(tetrabromopropoxy)(4 - isopropylbenzyl)phosphinyl]-cyclopentyl} p-tolylphosphonite
bis[1-(pentyloxybutylphosphinyl)-α-naphthylmethyl] dodecylphosphonite
bis{1-[(2-fluoroethoxy)phenylphosphinyl]propyl} ethylphosphonite
bis{1 - [(2,3 - dibromopropyl)pentylphosphinyl] -2- ethylhexyl} isopropylphosphonite
bis{1-[(methoxy)(4-ethylphenyl)phosphinyl]octyl} phenylphosphonite.

Reaction of the hydrocarbylphosphonous dichlorides with the aldehyde and the triorgano phosphorus ester is effected by simply mixing the three reactants at ordinary, decreased, or increased temperature and allowing the resulting reaction mixture to stand until formation of the diphosphinyl phosphonite. As herein stated, the reaction proceeds by replacement of each of the two chlorine atoms of the phosphonous dichloride. Two moles each of the aldehyde and of the phosphite or phosphonite are thus required per mole of the phosphonous dichloride;

and advantageously said dichloride, said aldehyde and said phosphite or phosphonite are used in a 1:2:2 ratio, for by employing this stoichiometric ratio there are obtained not only optimum yields, but there does not ensue the problem of separating excess unreacted material from the desired product. However, as will be apparent to those skilled in the art, the initial reaction mixture may contain excess aldehyde and phosphite or phosphonite; any unreacted material is thus simply separated from the diphosphinyl phosphonite product. In a continuous process, the phosphonous dichloride is gradually added to an equimolar mixture of the aldehyde and phosphite or phosphonite, while separating the diphosphinyl phosphonite product from the reaction mixture as it is formed.

Generally, the reaction is moderately exothermic; hence, no external heating need be customarily employed. This is particularly true when the carbonyl compound is a lower alkanecarboxaldehyde. With such aldehydes application of cooling is usually advantageous in order to obtain smooth reaction. When working with such active aldehydes, optimum conditions comprise gradual addition of the aldehyde to the mixture of phosphite or phosphonite and phosphonous dichloride with application of external cooling and thorough stirring. Usually it suffices to maintain the reaction temperature at, say, from 10° C. to 50° C. during addition of the aldehyde. When all of the aldehyde has been added to the mixture and there is no longer any evidence of exothermic reaction, completion of the reaction may be assured by heating the reaction mixture to a temperature of from, say, 50° C. to 150° C. With the more sluggish aldehydes, e.g., 2-phenylacetaldehyde or lauraldehyde, it may be necessary to heat the reaction mixture moderately, say, to a tempreature of about 50° C. before an exothermic reaction is initiated. Employing naphthaldehyde as the aldehyde reactant and a high molecular weight phosphite or phosphonite and phosphonous dichloride, even higher temperatures may be required, e.g., temperatures of from 100° C. to 150° C. appear to give the best yields. Since reactivity of the various reactants is thus known to vary, it is recommended that in each initial run the aldehyde, the phosphorus ester and the phosphonous dichloride be mixed gradually at low temperatures and that external heating be employed only when there appears to be no spontaneous increase in temperature as a consequence of the mixing. Generally, the reaction takes place readily in the absence of an inert diluent or catalyst. However, catalysts and diluents or solvents may be employed. The use of diluents may be particularly advantageous when working with the highly active aldehydes; such diluents may be, e.g., benzene, toluene, dioxane, methylene chloride, or hexane. When employing no diluent and using substantially the stoichiometric proportion of reactants, i.e., two molar equivalents of the phosphorus ester, two molar equivalents of the aldehyde and one molar equivalent of the phosphonous dichloride, the reaction product may be used directly for a variety of industrial and agricultural purposes without purification, i.e., it consists essentially of the diphosphinyl phosphonite product dissolved in the haloalkane which is produced as a by-product in the reaction. The diphosphinyl phosphonite compound is readily obtained from this by-product by volatilizing the haloalkane to give the diphosphinyl compound as residue.

The presently provided diphosphinyl phosphonite compounds are stable, generally high-boiling, materials which range from viscid liquids to waxy or crystalline solids. They are advantageously used as biological toxicants, e.g., as insecticides, fungicides, nematocides and bacteriostats. The essentially aromatic materials, i.e., those obtained from an aryl phosphonous dichloride and an aromatic aldehyde are particularly useful as functional fluids, e.g., in force-transmission media and dielectric applications. The present compounds are generally useful as plasticizers for synthetic resins and plastics, as rubber-compounding chemicals and as flame-proofing agents for cellulosic and carbonaceous, combustible materials.

The presently provided compounds are particularly valuable as additives to gasoline and other hydrocarbon fuels containing organolead compounds. Continued use of such fuels is known in the art to result in spark plug fouling caused by deposition of the organolead compound. Addition of the present compounds in very small quantities to the lead-containing fuels prevents such fouling. The presently provided compounds thus serve as lead scavengers. In the laboratory, the efficiency of a lead scavenger can be readily determined by noting pre-ignition glow of deposits resulting from organolead accumulation; hence, lead scavengers are often referred to as "glow-suppressing agents." Thus, in one test, a gasoline fuel containing 0.02721 part by weight of tetraethyllead is delivered to a "Glow Testor" at the rate of 1.5±0.1 ml./15 minutes and the amount of additive required to suppress glow at 1,000° F. is measured. It has been found that tricresyl phosphate, a commercially employed lead scavenger, suppresses glow when present in the leaded gasoline in a concentration of 0.0984 part by weight. On the other hand, use of the bis[α-(dihexyloxyphosphinyl)benzyl] phenylphosphonite of Example 2 below suppresses glow at a concentration of only 0.0357 part by weight.

The invention is further illustrated by, but not limited to, the following examples:

*Example 1*

To an externally ice-cooled mixture consisting of 265.2 g. (1.0 mole) of tris(2-chloroethyl) phosphite and 89.5 g. (0.5 mole) of phenylphosphonous dichloride there was added, during 0.3 hour, 64.5 g. of propionaldehyde. The temperature of the reaction mixture during the aldehyde addition was maintained at 18–20° C. When all of the aldehyde had been added, the reaction mixture was warmed to 90° C., cooled to 40° C., and placed under water-pump vacuum and warmed to 80° C. in order to remove by-products. Concentration to a pot temperature of 150° C./2.6 mm., gave as residue 313.0 g. (100% theoretical yield) of the substantially pure bis{1-[bis(2 - chloroethoxy)phosphinyl]propyl} phenylphosphonite, $n_D^{25}$ 1.5170, analyzing 38.22% carbon and 5.39% hydrogen as against 37.8% and 5.23%, the calculated values, and having the structure

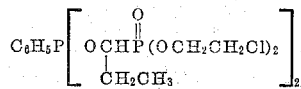

*Example 2*

To a mixture consisting of 62.7 g. (0.35 mole) of phenylphosphonous dichloride and 234 g. (0.70 mole) of trihexyl phosphite there was gradually added 74.3 g. (0.70 mole) of benzaldehyde. The reaction mixture was cooled moderately in order to maintain the temperature below 35° C. When no further rise in temperature was evidenced, it was slowly warmed to 97° C. and finally concentrated to a pot temperature of 183° C./1 mm. There was thus obtained as residue 273 g. (95% theoretical yield) of the substantially pure bis[α-(dihexyloxyphosphinyl)benzyl] phenylphosphonite, $n_D^{25}$ 1.5068, of the structure

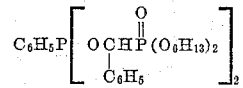

*Example 3*

To a mixture consisting of triethyl phosphite (10.0 g., 0.06 mole) and 4.6 g. (0.079 mole) of propionaldehyde there was added under a nitrogen atmosphere and with cooling, 4.49 g. (0.028 mole) of n-butylphosphonous dichloride at a temperature of 9–15° C. during a time of about 6 minutes. The colorless reaction mixture was warmed to 70° C., transferred to a distilling flask, and concentrated to a pot temperature of 110° C./0.3 mm., to give as residue 12.0 g. (90% theoretical yield) of the substantially pure bis[1-(diethoxyphosphinyl)propyl] n-butylphosphonite of the formula

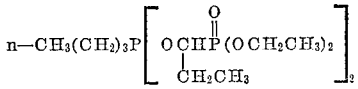

Example 4

To a mixture consisting of 19.8 g. (0.10 mole) of diethyl phenylphosphonite and 8.95 g. (0.05 mole) of phenylphosphonous dichloride, cooled to 20° C., there was added 4.4 g. (0.10 mole) of acetaldehyde. When the addition was completed, the cooling bath was removed and the mixture was heated to 75° C. to insure complete reaction. By-product, ethyl chloride, was removed by heating the reaction mixture under vacuum. The residue was concentrated to 80° C./1.5 mm. to obtain bis[1-(ethoxyphenylphosphinyl)ethyl] phenylphosphonite, $n_D^{25}$ 1.5583, having the formula

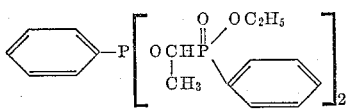

This application is a continuation-in-part of my co-pending application Serial No. 780,223, filed December 15, 1958, and now abandoned.

What I claim is:

1. A compound of the formula

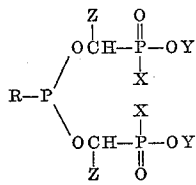

in which R is selected from the class consisting of alkyl, aryl, alkaryl and aralkyl radicals of from 1 to 12 carbon atoms, Z is selected from the class consisting of hydrogen, alkyl, aryl, alkaryl and aralkyl radicals of from 1 to 11 carbon atoms, Y is selected from the class consisting of alkyl and haloalkyl radicals of from 1 to 12 carbon atoms, and X is selected from the class consisting of —OY and R.

2. A compound of the formula

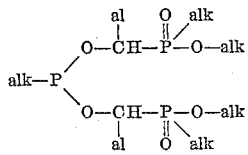

in which alk is an alkyl radical of from 1 to 12 carbon atoms and al is an alkyl radical of from 1 to 11 carbon atoms.

3. A compound of the formula

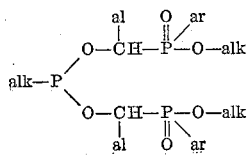

in which alk is an alkyl radical of from 1 to 12 carbon atoms, al is an alkyl radical of from 1 to 11 carbon atoms, and ar is an aromatic hydrocarbon radical of from 6 to 12 carbon atoms.

4. A compound of the formula

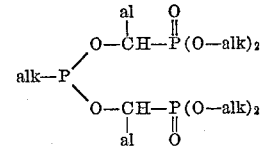

in which alk is an alkyl radical of from 1 to 12 carbon atoms and al is an alkyl radical of from 1 to 11 carbon atoms.

5. A compound of the formula

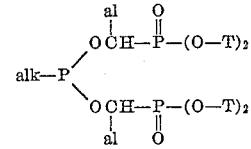

in which alk is an alkyl radical of from 1 to 12 carbon atoms, al is an alkyl radical of from 1 to 11 carbon atoms and T is a haloalkyl radical of from 1 to 12 carbon atoms.

6. A compound of the formula

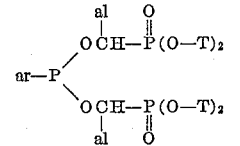

in which ar is an aromatic hydrocarbon radical of from 6 to 12 carbon atoms, al is an alkyl radical of from 1 to 11 carbon atoms, and T is a haloalkyl radical of from 1 to 12 carbon atoms.

7. A compound of the formula

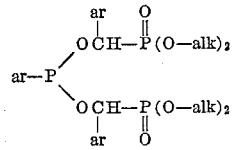

in which ar is an aromatic hydrocarbon radical of from 6 to 12 carbon atoms and alk is an alkyl radical of from 1 to 12 carbon atoms.

8. A compound of the formula

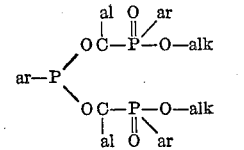

in which ar is an aromatic hydrocarbon radical of from 6 to 12 carbon atoms, al is an alkyl radical of from 1 to 11 carbon atoms and alk is an alkyl radical of from 1 to 12 carbon atoms.

9. Bis{1 - [bis(2 - chloroethoxy)phosphinyl]propyl} phenylphosphonite.

10. Bis[α-(dihexyloxyphosphinyl)benzyl] phenylphosphonite.

11. Bis[1 - (diethoxyphosphinyl)propyl] n-butylphosphonite.

12. Bis[1-(ethoxyphenylphosphinyl)ethyl] phenylphosphonite.

No references cited.